(12) United States Patent
Lundh et al.

(10) Patent No.: US 9,037,676 B1
(45) Date of Patent: May 19, 2015

(54) SYSTEMS AND METHODS FOR SCHEDULED ONLINE PUBLISHING OF INTERNET MEDIA

(75) Inventors: Jim Fredrik Lundh, Wadenswil (CH); Shenaz Zack, Foster City, CA (US); John A. Zeratsky, San Francisco, CA (US); Patrick Hung, San Bruno, CA (US); Mohan V. Nibhanupudi, San Jose, CA (US); Philo Juang, Los Angeles, CA (US); Reuben Mark Antman, Danville, CA (US); Tim Dasilva, North Hills, CA (US); Dean M. Yasuda, Fremont, CA (US); Namhee Koo, San Francisco, CA (US); Timothy Hiroshi Mansfield, Long Beach, CA (US); Stanley Wang, San Francisco, CA (US); Joshua R. Siegel, San Francisco, CA (US); Anton Tonchev Koinov, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/411,079

(22) Filed: Mar. 2, 2012

(51) Int. Cl.
*G06F 17/30* (2006.01)
*G06F 21/60* (2013.01)
*G11B 20/00* (2006.01)
*G07C 13/00* (2006.01)
*G06Q 30/02* (2012.01)

(52) U.S. Cl.
CPC ............... *G06F 17/30* (2013.01); *G06F 21/60* (2013.01); *G07C 13/00* (2013.01); *G11B 20/00869* (2013.01); *G06F 17/3089* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,910,049 B2 * | 6/2005 | Fenton et al. ....................... 1/1 |
| 2007/0245020 A1 * | 10/2007 | Ott ................. 709/225 |
| 2008/0097915 A1 * | 4/2008 | Golan et al. .................... 705/51 |
| 2009/0089352 A1 * | 4/2009 | Davis et al. ................... 709/201 |
| 2009/0172129 A1 * | 7/2009 | Singh et al. ................... 709/217 |
| 2009/0228491 A1 * | 9/2009 | Malik ............................. 707/10 |
| 2009/0282468 A1 * | 11/2009 | Banga et al. ...................... 726/8 |
| 2010/0293058 A1 * | 11/2010 | Maher et al. ............... 705/14.66 |
| 2011/0112915 A1 * | 5/2011 | Geer et al. ................. 705/14.73 |

\* cited by examiner

*Primary Examiner* — Kaveh Abrishamkar
*Assistant Examiner* — Janusz Kusyk
(74) *Attorney, Agent, or Firm* — Amin, Turocy & Watson, LLP

(57) ABSTRACT

This disclosure relates to scheduled online publishing of internet media. Media content, such as a video, can be received for upload to an online server. A future publish time for the media content is determined based on user input, or satisfaction of a set of predetermined criteria. The media content is maintained as unpublished until the future publish time. Exposure of the media content is restricted to authorized users while the media content is unpublished. At the future publish time, the media content is published, and provided to a set of content consumers via the online server.

16 Claims, 13 Drawing Sheets

SYSTEMS AND METHODS FOR SCHEDULED ONLINE PUBLISHING OF INTERNET MEDIA

TECHNICAL FIELD

The subject disclosure generally relates to systems and methods that facilitate scheduled online publishing of internet media.

BACKGROUND

Internet video enables users to view video content virtually anywhere at any time, as long as they have access to a video capable device with an internet connection. The convenience of being able to view video content via the internet, essentially on demand, has resulted in explosive growth of internet video viewing. Internet video traffic is currently approaching over fifty percent of consumer internet traffic, and the rate of demand is projected to continue increasing.

The ever increasing volume of video content available online can make finding desirable content a challenge to users. However, the relationship between social networking and internet video has become nearly ubiquitous, and social networking allows internet videos to spread virally to large numbers of users in a relatively short period of time. Frequently, within a matter of hours after being published a video can propagate across the web. The virality of internet videos can be attributed to a number of factors beyond content, including inter-personal relationships, promotion, and various leaderboards and ranking systems. Users will often choose to view video content that has been viewed by another member of their social network, or that is popular among other users.

To promote content, video sites often rank content using leaderboards based on number of views, shares, comments, and so forth over a given time period, such as a day, a week, or a month. For users, leaderboards and ranking systems assist in discerning content that is popular or trending, and can serve as a filter for desirable content. In addition, the leaderboards and ranking systems enable the video sites to dynamically adjust to changing trends in viewership. Accordingly, leaderboards and ranking systems can be evidence of such increased traffic, as well as a catalyst for additional traffic, both for the content and the video site with the leaderboard/ranking system. Moreover, content owners have an incentive to produce quality content to increase traffic to their content.

Once a video has been uploaded and made available to the public, the content owner may have little control over any possible viral spreads. Moreover, if promotional and social networking efforts are not correctly timed with a launch of the video, then the content owner may miss out on opportunities to be included in various leaderboards and ranking systems, which could hinder overall number of views and general success of the content. In addition, releasing a video prior to finalization, review, or approval can result in unintended embarrassment or financial loss for a content owner.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for scheduled online publishing of online media content are disclosed. When a content owner initiates an upload of media content to a content server, a delayed-publishing component determines a publish time for the media content. A publishing management component maintains the media content as unpublished until the publish time, and a batch processing component publishes the media content at the published time. The publish time can be set by user input, or determined based on satisfaction of a set of predetermined conditions.

In an embodiment, a delayed-publishing component determines a set of publishing times, wherein individual publishing times included in the set of publishing times are associated with different groups of viewers. A publishing management component maintains the media content as unpublished until a publish time in the set of publish times, and a batch processing component publishes the video to a group of viewers associated with an individual publishing time at the individual publishing time.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
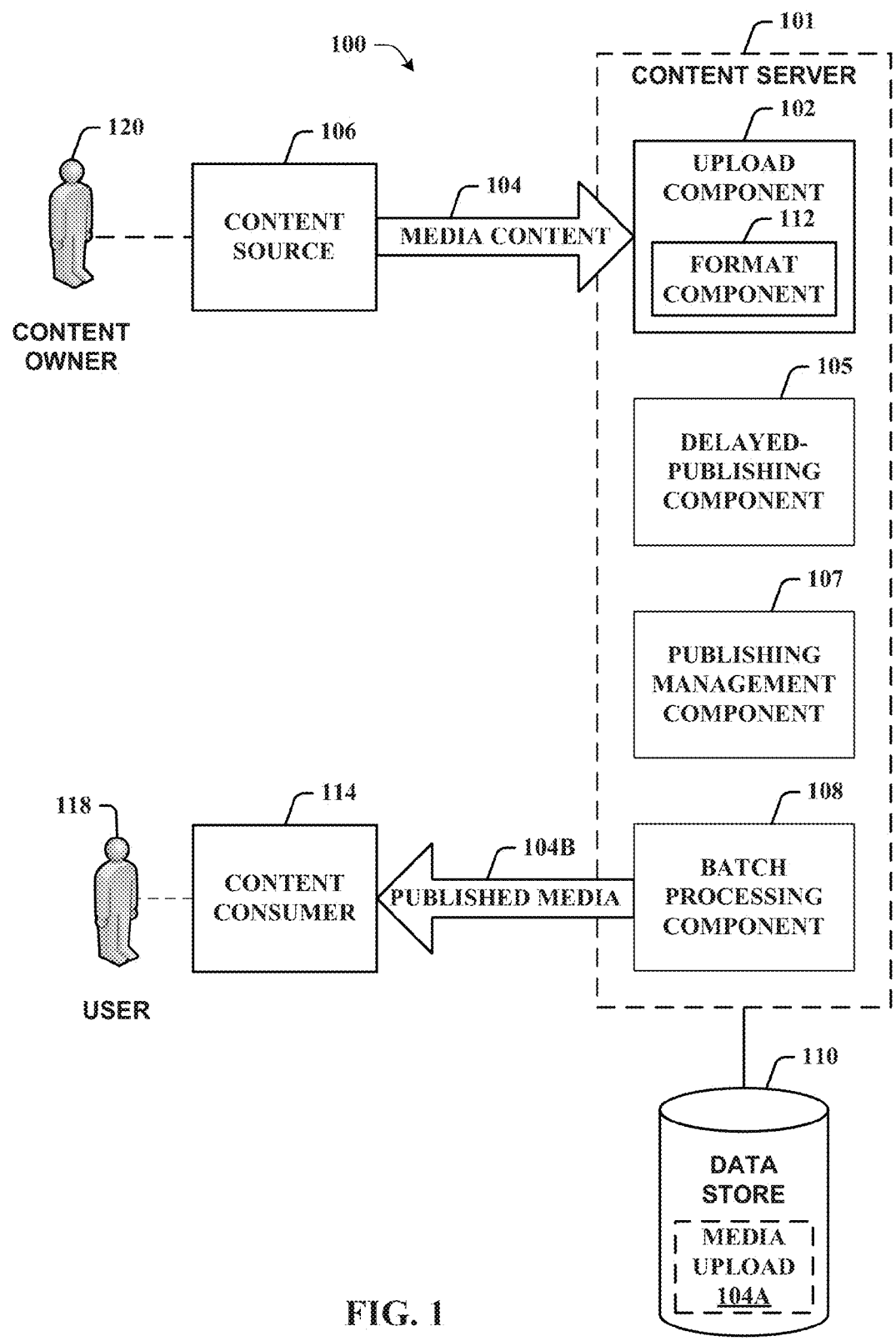
FIG. 1 illustrates an example system for scheduled online publication of internet media in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

A content owner can have little influence over limiting the viral spread of digital media once it has been made publicly available on the internet. Accordingly, premature publishing of video prior to administrative review, finalization, or approval can result in unintended disclosure of information, or financial loss for the content owner, for example. Additionally, an incorrectly timed launch of a video may preclude the content owner from maximizing standings in rankings or leaderboards, and decrease a desired virality of the video.

One non-limiting implementation of the innovation provides for scheduled online publishing of internet videos to prevent premature publishing and facilitates content owners maximizing rankings and virality for their online videos. The implementation enables a publish time to be set for digital media (e.g., internet media, video, etc.) at time of upload, and the digital media to be maintained as unpublished until publish time.

In accordance with an embodiment, a publish time is determined for internet media by a delayed-publishing component. The publish time is determined prior to completion of uploading and transcoding of the internet media performed by a content server. After completion of the upload process, a publishing management component maintains the internet media upload as unpublished until the publish time, and a batch processing component publishes the internet media at the published time. The publish time can be based on user input or satisfaction of a set of predetermined conditions or criteria.

In one embodiment, a delayed-publishing component determines a set of publishing times, wherein individual publishing times included in the set of publishing times are associated with groups of viewers. A publishing management component maintains the internet media as unpublished until an individual publishing time, and a batch processing component publishes the video to a group of viewers associated with the individual publishing time at the individual publishing time.

Non-Limiting Examples of Scheduled Online Publishing of Internet Media

Turning now to FIG. 1, illustrated is an example system 100 for scheduled online publication of internet media in accordance with various aspects described in this disclosure. Generally, system 100 can include a memory that stores computer executable components and a processor that executes computer executable components stored in the memory, examples of which can be found with reference to FIG. 13. The system 100 includes a content server 101. A content source 106 uploads, sends, or otherwise transmits media content 104 to the content server 101, e.g., via a network or cellular connection. The content source 106 can include, for example, a personal computer, laptop, net book, tablet, smart phone, mobile phone, camera, webcam, personal digital assistant, portable music player, portable video game system, video game system, web enabled television, or virtually any media capable device. The content server 101 includes an upload component 102, a delayed-publishing component 105, a publishing management component 107, and a batch processing component 108.

The upload component 102 receives, acquires, or otherwise obtains the media content 104 from the content source 106, and stores the media content 104 in an associated data store 110 as a media upload 104A. In addition, the upload component 102 includes a format component 112 that transcodes, converts, or otherwise formats the media content 104. For example, the format component 112 may convert the media content 104, which is in a first format, to the media upload 104A, which is in a second format. Accordingly, in one embodiment, the format component 112 includes one or more decoders and one or more encoders. In addition, the format component 112 analyzes and prepares the media upload 104A for publication.

The delayed-publishing component 105 determines a publish time for the media upload 104A. The delayed-publishing component 105 can determine the publish time based on input from the content owner 120 when the media content 104 is transferred to the content server 101. For example, the publish time may be a predetermined date and time provided to the delayed-publishing component 105 by the content owner 120 (e.g., MM/DD/YYYY at HH:MM in a certain time zone). Additionally or alternatively, the delayed-publishing component 105 can determine the publish time based on a default setting, or a set of predetermined user preferences. For example, if the content owner 120 does not provide a publish time, then a default setting can provide for immediate publication. Additionally or alternatively, the content owner may have a predetermined preference that provides for the media upload 104A to be published at a predetermined time (e.g., one hour, 24 hours, etc., at midnight) after completion of the upload process.

The publishing management component 107 maintains the media upload 104A as private, restricted, or otherwise unpublished until publish time. For example, during the period of time from uploading of the media content 104 and until the publish time, the publishing management component 107 restricts access to the media upload 104A to only the content owner 120, and other users authorized to view or access the unpublished media uploads 104A, such as for example administrators, authorized advertisers, or authorized users designated by the content owner 120.

The batch processing component 108 grants broader access to, makes public or otherwise publishes the media upload 104A. The published media 104B is transmitted, sent, or otherwise provided to a content consumer 114. For example, the batch processing component 108 may expose the published media 104B on a published watch page. The content consumer 114 can be, for example, a computing device that downloads, streams, or otherwise receives the published media 104B via the published watch page. Hence, content consumer 114 presents the published media 104B via a suitable display or output mechanism, which can be observed and/or managed by an associated user 118. In addition, the batch processing component 108 executes at a predetermined time or time interval (e.g., 10 minutes, 1 hour, etc.), and publishes media uploads maintained in the data store 110 having a publication time within a predetermined threshold of the predetermined time interval for execution. For example, a predetermined execution time of the batch processing component 108 can be 10 A.M. EST (Eastern Standard Time), and media uploads maintained in the data store 110 having a publication time within ten minutes of 10 A.M. EST (9:50 A.M. EST to 10:10 A.M. EST) are published.

In one embodiment, the batch processing component 108 initiates indexing of the published media 104B based in part on the publish time. For example, the batch processing component 108 can initiate indexing of the published media 104B at about the publish time, a predetermined amount of time after the publish time, or a predetermined amount of time before the publish time. Indexing of the published media 104B based on the publish time enables increased control over the media upload 104A by the content owner 120. For instance, by indexing the published media 104B at about the time of the publication (e.g., instead of the time of upload) the opportunity for the published media 104B to be included in time sensitive leaderboards (discussed in greater with reference to FIG. 7) is significantly improved. As an example, if the content owner 120 uploads the media content 104 to the content server 101 on August $1^{st}$, but the publish time is September $1^{st}$, time sensitive leaderboards or rankings calculated using the publish time (e.g., as opposed to an upload time) can include the published media 104B. Alternatively, if the published media 104B is indexed at time of upload, then it may be excluded from participating in leaderboards or rankings, where an upload time is used in calculating the leaderboards or rankings.

Similarly, user subscriptions updated based on the publication date will more accurately reflect availability of unpublished media uploads 104A. Returning to the previous example, if user subscriptions are updated based on upload date, the media upload 104A can be added to the user's 118 subscription as being from August $1^{st}$, despite not being published until September $1^{st}$. It can be appreciated that if the user 118 views a subscription page in chronological order, then the media upload 104A can go unnoticed. In contrast, if the batch processing component 108 initiates indexing of the published media 104B based in part on the publish time, and the media upload 104A is added to the user's 118 subscription as being from September $1^{st}$, then it is less likely to be misplaced in a chronologically sorted subscription page.

Figure 2:
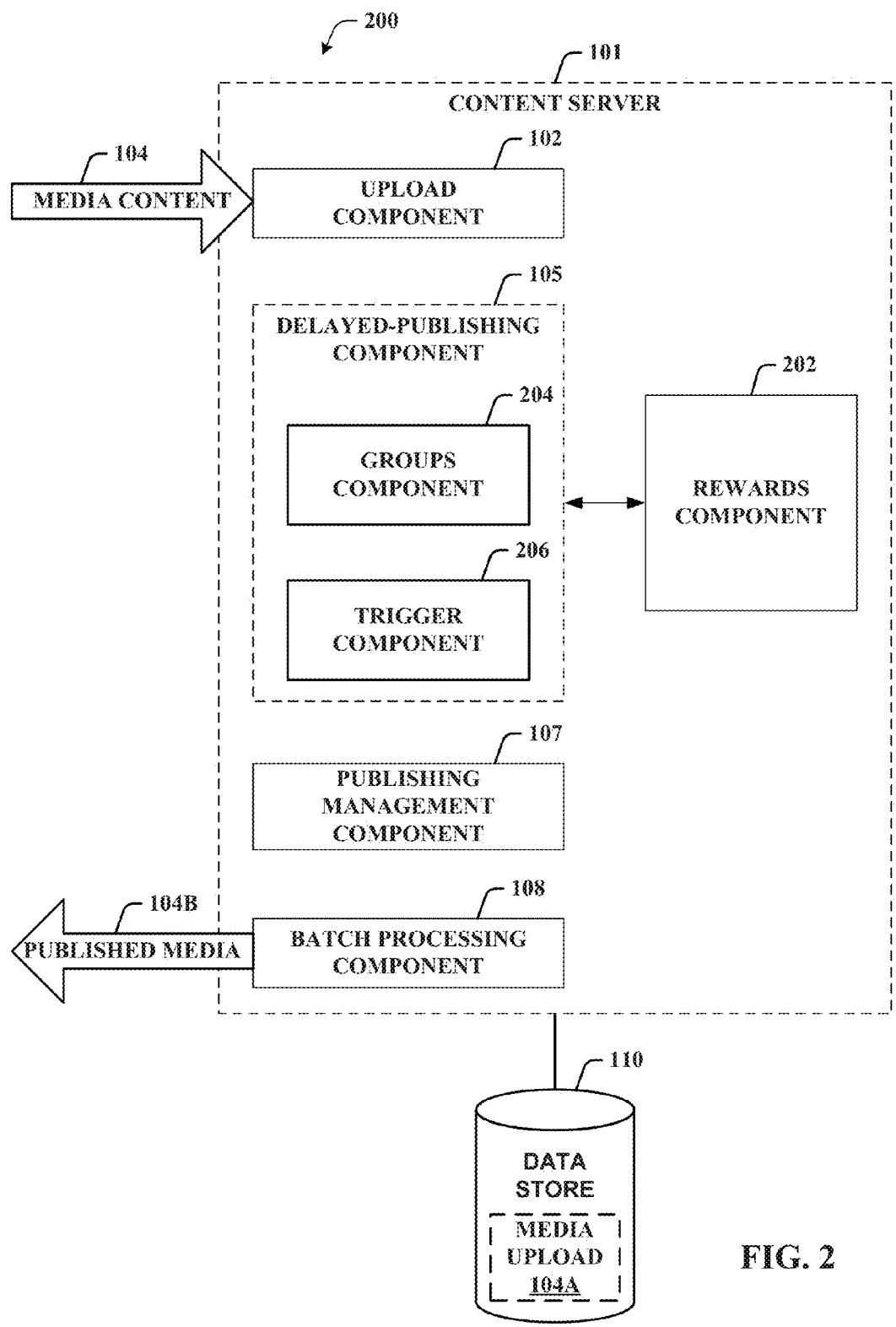
FIG. 2 illustrates an example system for scheduled online publication of internet media in accordance with various aspects described in this disclosure.

FIG. 2 illustrates an example system 200 for scheduled online publication of internet media in accordance with various aspects described in this disclosure. The system 200 includes the content server 101. The content server 101 obtains media content 104 (e.g., video, music, pictures, documents, etc.) from a content source 106. The content server 101 in FIG. 2 includes an upload component 102, a delayed-publishing component 105, a publishing management component 107, a batch processing component 108, and a rewards component 202.

The delayed-publishing component 105 in FIG. 2 includes a groups component 204 and a trigger component 206. As discussed, the delayed-publishing component 105 determines a publish time for the media content 104. The groups component 204 determines a set of publish times associated with a set of groups. For example, the set of publish times can include a first publish time, a second publish time, and a third publish time, associated with a first group, a second group, and a third group, respectively. Additionally, the publishing management component 107 can maintain the media upload 104A as unpublished to the first group until the first publish time, to the second group until the second publish time, and to the third group until the third publish time (discussed in greater with reference to FIGS. 4 and 5).

The trigger component 206 determines the publish time, or the set of publish times, based on satisfaction of a set of predetermined conditions (e.g., criteria). For example, the set of predetermined conditions can include, but is not limited to, advertisement approval, user approval, administrator approval, or occurrence of a predetermined event. The publishing management component 107 can maintain the media upload 104A as unpublished until satisfaction of the set of predetermined conditions.

The rewards component 202 allocates, assigns or otherwise associates one or more honors with the media content 104, or a content owner 120 associated with the media content 104, based at least in part on the publish time determined by the delayed-publishing component 105. For example, the rewards component 202 can designate the media upload 104A as receiving the most views in a forty-eight hour period. As an additional example, the rewards component 202 can generate a leaderboard including a set of videos published during a specified time period that received the most comments, views, and/or clicks, and so forth.

Figure 3:
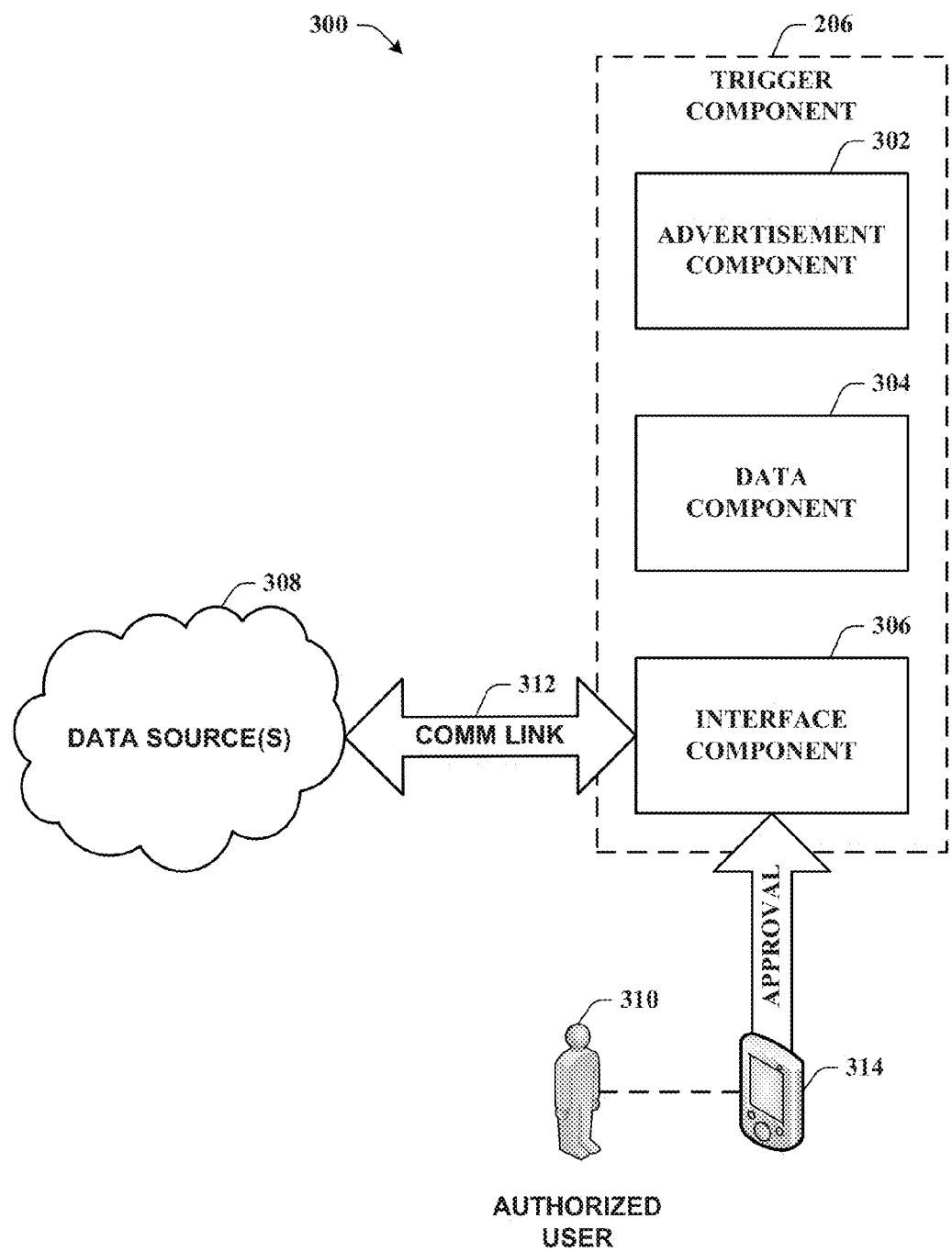
FIG. 3 illustrates an example trigger component in accordance with various aspects described in this disclosure.

FIG. 3 illustrates an example trigger component 206 in accordance with various aspects described in this disclosure. As discussed, the trigger component 206 determines a publish time, or a set of publish times, based on user input, or satisfaction of a set of predetermined conditions, including but not limited to, advertisement approval, user approval, administrator approval, or occurrence of a predetermined event.

The trigger component 206 in FIG. 3 includes an advertisement component 302, a data component 304, and an interface component 306. The advertisement component 302 determines that advertisement approval has been acquired for a media upload 104A. Advertisement approval can be received, acquired, or otherwise obtained from a set of prospective advertisers. The advertisement approval enables advertisements from the set of prospective advertisers to be associated with the media upload 104A. For example, a prospective advertiser can review the media upload 104A, and provide an advertisement approval upon determining that the media upload 104A is suitable for association with their product or organization. Additionally or alternatively, the advertisement approval can be a predetermined advertising threshold (e.g., monetary value or quantity of advertisements). For example, at least $1,000 USD of advertisements can be required to be associated with the media upload 104A in order to satisfy an advertisement approval threshold.

The data component 304 determines, acquires, or otherwise obtains data relating to satisfaction of the set of predetermined conditions, such as the occurrence of a predetermined event, on which the publication time for the media upload 104A can be based. For example, in one implementation, the trigger component 206 determines a publish time of the media upload 104A based on outcome of an external event, such as a political election. For instance, the data component 304 can acquire data regarding the outcome of the election and determine that the condition has been satisfied. The data component 304 may obtain data from a plurality of data sources 308, which may include but is not limited to user input, associated databases, data feeds from particular sources, the World Wide Web (web), search engine results, and/or the data store 110.

The interface component 306 includes any suitable and/or necessary adapters, connectors, channels, communication paths, etc. to enable the trigger component 206 to communicate with any suitable operating, search, data feed, and/or database system(s). Moreover, the interface component 306 provides various adapters, connectors, channels, communication paths, etc., that provide for interaction with the trigger component 206. For example, the interface component 306 can receive user approval from an authorized user 310. The authorized user 310 can be connected to the content server 101 via an internet enabled application operable on a mobile device 314, and the interface component 306 can facilitate communication with the internet enabled application. As an additional example, the interface component 306 can enable the data component 304 to access the web via a communications link 312, and retrieve data regarding satisfaction of the set of conditions (e.g., election results).

Figure 4:
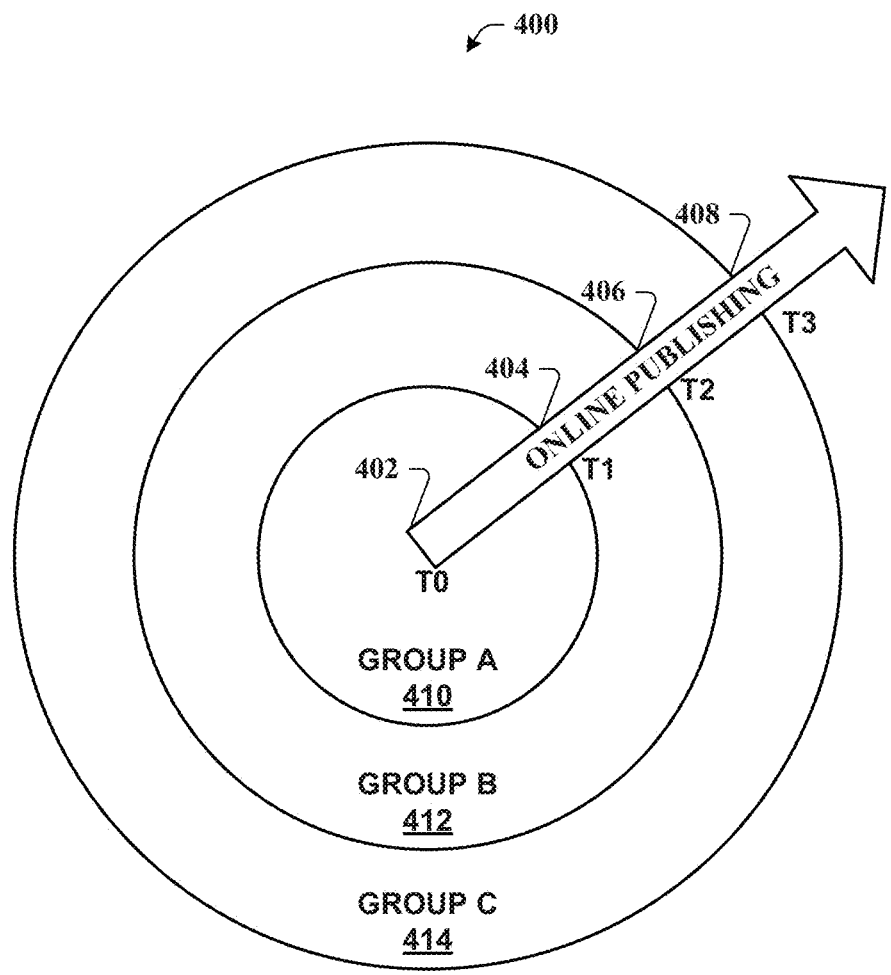
FIG. 4 illustrates an example diagram of a set of scheduled online publications for internet media in accordance with various aspects described in this disclosure.

Turning now to FIG. 4, illustrated is an example diagram of a set of scheduled online publications 400 for internet media in accordance with various aspects described in this disclosure. As discussed, a set of publish times can be determined for a media upload, and the set of publish times can be associated with a set of groups. The media upload is maintained as unpublished for each group until their respective publish times. For example, the set of publish times can include a first publish time 404, a second publish time 406, and a third publish time 408, that are associated with a first group 410 (e.g., group A), a second group 412 (e.g., group B), and a third group 414 (e.g., group C), respectively.

At an initial time 402, media content is uploaded to a content server (e.g., content server 101) and maintained as unpublished to each of the three groups (410, 412, and 414) until the first publish time 404. At the first publish time 404, the media upload is published to the first group 410. For example, the first group 410 can consist of a set of prospective advertisers that have been authorized to view the media upload in order to provide an advertisement approval. The first publish time 404 can be a predetermined amount of time (e.g., 1 hour, 1 day, 1 week, etc.) after the initial time 402 that the content owner desires to restrict access by the first group 410 to the media content.

At the second publish time 406, the media upload is also published to the second group 412. Continuing with the previous example, the second publish time 406 can be determined based on satisfaction of a predetermined condition, such as attaining the advertising approval from the first group 410. In addition, as an incentive to subscribe to the content owner's media uploads, channel, etc., the content owner may desire to release the media upload to a set of subscribers prior to publishing the media upload to a wider audience. Therefore, the second group 412 can include, for example, a set of subscribers.

At the third publish time 408, the media upload is further published to the third group 414. Returning again to the previous example, the third publish time 408 can be determined based on satisfaction of a predetermined condition, such as acquiring a number of views of the media upload greater than a predetermined threshold. The content owner may desire to publicly publish the media upload on satisfaction of the predetermined condition. The third group 414 can include, for example, all users of the content server (e.g., general publication). It is to be appreciated that the foregoing represents but a few examples, and aspects of the innovation are not limited to a particular number of groups, publish times, and/or predetermined conditions for determining the publish times.

Figure 5:
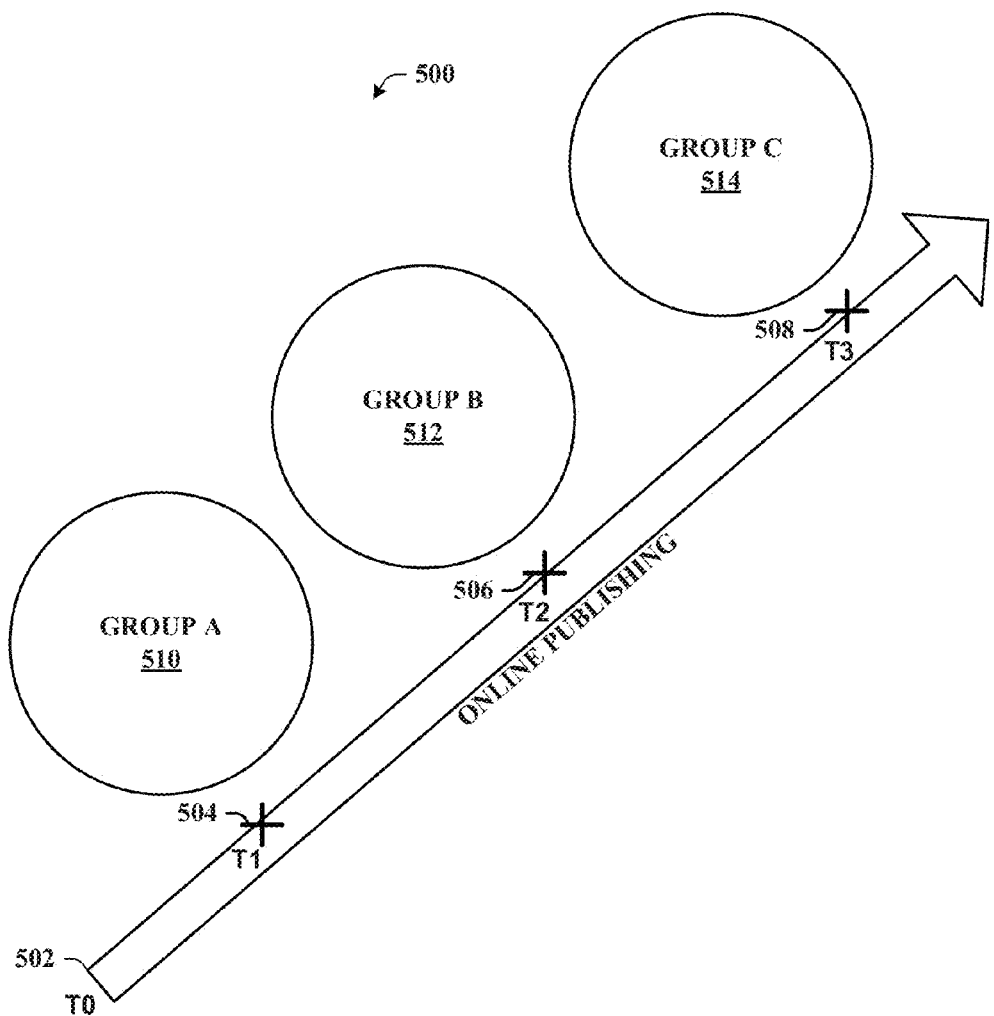
FIG. 5 illustrates an example diagram of a set of scheduled online publications to different groups in accordance with various aspects described in this disclosure.

FIG. 5 illustrates an example diagram of a set of scheduled online publications 500 to different groups in accordance with various aspects described in this disclosure. It is to be appreciated that a media upload can be published to different groups associated with a set of publish times. At an initial time 502, media content is uploaded to a content server (e.g., content server 101), and maintained as unpublished to each group included in a set of different groups (510-514) until a first publish time 504. At the first publish time 504, the media upload is published to a first group 510. At a second publish time 506, the media upload is published to the second group 512, and can be unpublished to the first group 510. At a third publish time 508, the media upload is published to a third group 514, and can be unpublished to the second group 512, while remaining unpublished to the first group 510. As an example, a content owner may desire to publish the media upload to the set of different groups (510-514) at the publish times (504-508) in order to prevent unauthorized dissemination of the media upload. It is to be appreciated that the foregoing represents but a few examples, and aspects of the innovation are not limited to a particular number of groups, publish times, and/or predetermined conditions for determining the publish times.

Figure 6:
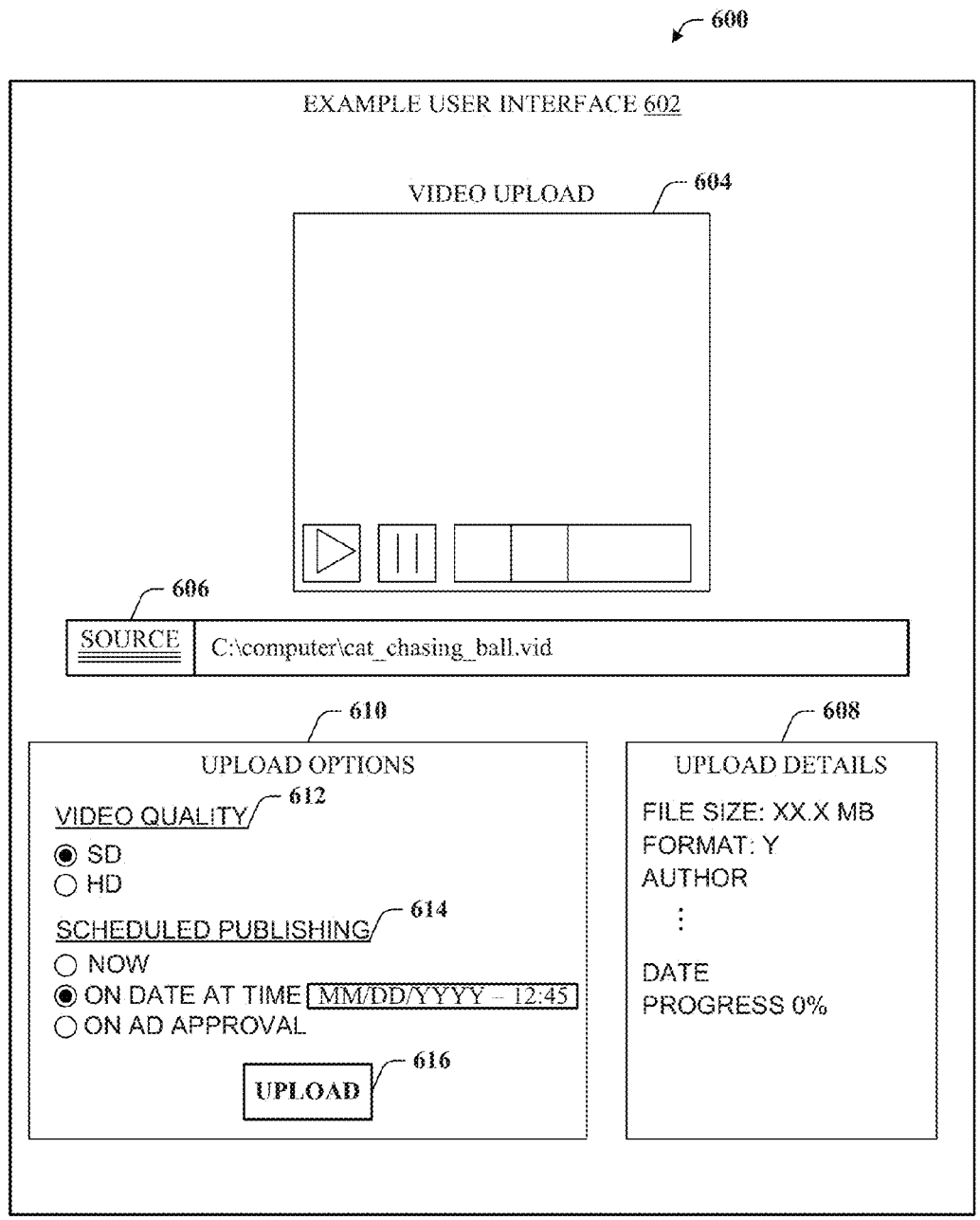
FIG. 6 illustrates a system that provides a non-limiting example of a user interface in accordance with various aspects described in this disclosure.

Non-Limiting Examples of a User Interface and Determining Publish Times Via the User Interface Referring to FIG. 6, illustrated is a system 600 that provides a non-limiting example of a user interface 602 in accordance with various aspects described in this disclosure. The interface 602 can include a video upload display window 604 that provides for inspection, viewing, or replay of media content targeted for upload (e.g., a target media upload). For example, a user may desire to view a video, prior to uploading, to ensure that it is the correct video, and/or that the video displays as intended. In addition, the user interface 602 can include a file location field 606 that enables the user to locate the target media upload, or enter a source path for the target media upload. The target media upload can be uploaded from, for example a user device, web site, or cloud based storage. An upload details section 608 can display virtually any information relating to the target media upload, such as file size, format, metadata, date, upload progress, and so forth, as made available by the content, content owner, and/or uploading user.

The user interface 602 can also include an upload options section 610 that provides for the uploading user to input or select various options relating to the uploading of the target media file. For example, the upload options section 610 can include a set of video quality options 612 that provide for the user to determine a resolution at which the video will be displayed once published. For instance, the video quality options 612 can include standard definition (SD) or high definition (HD), and transcoding of the target media file during the upload process can be based at least in part on the video quality options 612 selected by the user.

Furthermore, the upload options section 610 can include a set of scheduled publishing options 614 that provide for the user to set a publish time for the media upload. For example, a user can select an option to publish the upload immediately (e.g., NOW), or the user can provide a date and/or time to publish the upload (e.g., ON DATE AT TIME). As an additional example, the user can set the upload to be published on satisfaction of a set of predetermined conditions (e.g., ON AD APPROVAL). The upload options section 610 can further include an upload button 616 that, when selected, completes the upload process. The system 600 can require that one or more fields included in the user interface 602 be selected or entered prior to completing the upload process. For example, if the user fails to select a scheduled publishing option 614, then the user interface 602 can expose a warning to the user that the upload process will not continue until a scheduled publishing option 614 is selected. As an additional example, the system 600 can expose a warning that a default setting, or predetermined user preference, will be used if a scheduled publishing option 614 is not selected.

Figure 7:
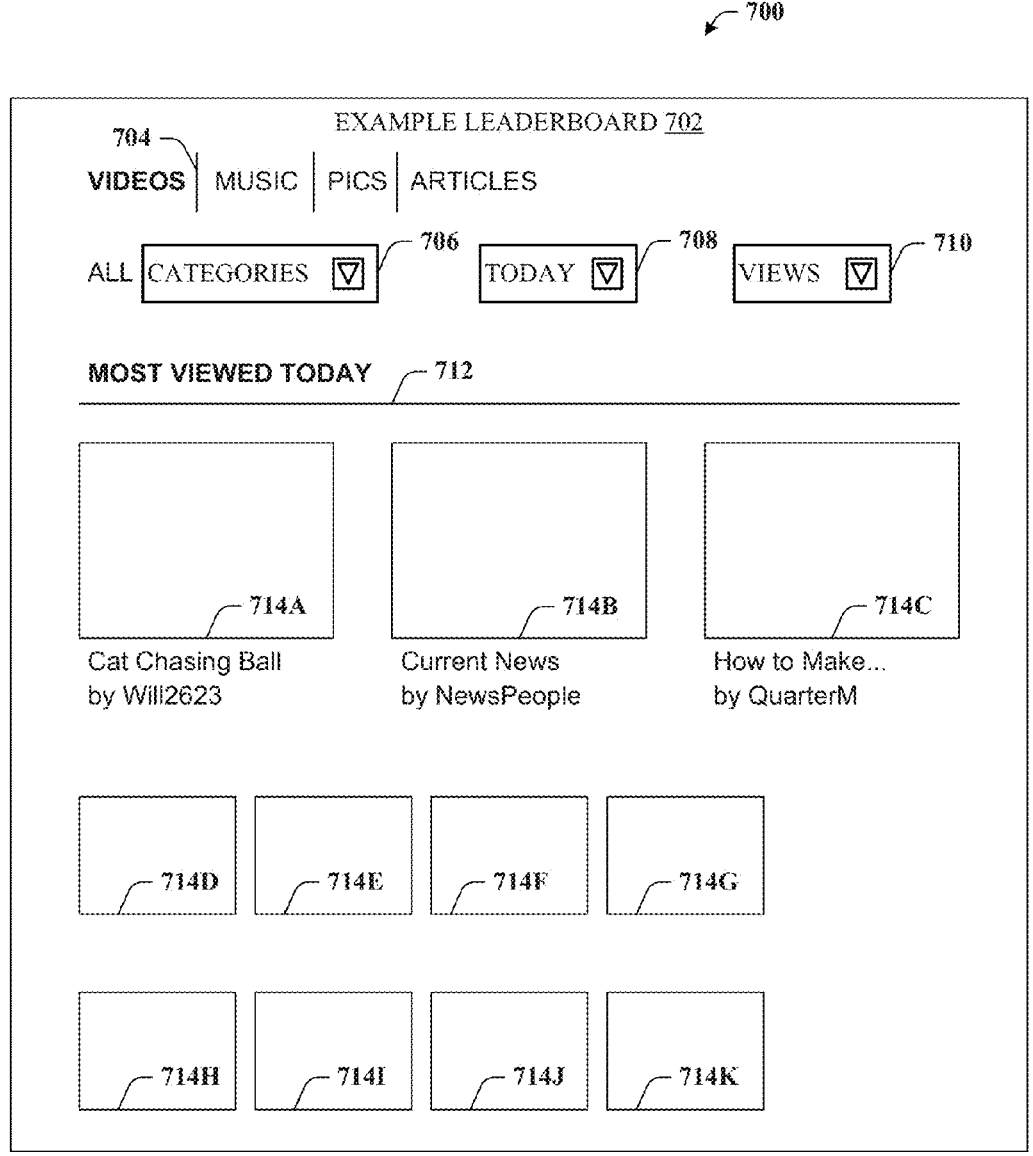
FIG. 7 illustrates a system that provides a non-limiting example of a leaderboard in accordance with various aspects described in this disclosure.

Turning now to FIG. 7, illustrated is a system 700 that provides a non-limiting example of a leaderboard 702 in accordance with various aspects described in this disclosure. The leaderboard 702 includes a set of media selection options 704. The media selection options provide for a user to click, choose, or otherwise select a media type that will be displayed via the leaderboard 702. For example, the media selection options 704 can include, but are not limited to, videos, music, pictures (e.g., pics), and articles. The leaderboard 702 also includes a category selection menu 706. The category selection menu 706 provides for the user to sort the media displayed on the leaderboard 702 based on a set of categories. For example, the categories can include all media, automotive, comedy, education, entertainment, gaming, music, news, sports, and so forth. In addition, a time period selection menu 708 provides for the user to sort the leaderboard 702 based on a predetermined time period. For example, the predetermined time periods in the time period selection menu 708 can include, today (e.g., within the last twenty four hours), this week, this month, or this year. The leaderboard 702 further includes a criteria selection menu 710 that enables a user to sort the media displayed on the leaderboard 702 based on an attribute, such as, a number of views, a number of comments, a number of likes/dislikes, and so forth.

A leaderboard display section 712 displays a set of media 714A-K. For example, if the user selects to view the most viewed videos today, then the leaderboard display section 712 displays the set of videos 714A-K that have received the most views within the past 24 hours. The user can click or otherwise select a video 714A-K to view the video. Due to the large quantity of internet videos available, the user may desire to view video content that is popular among other users. In this way, leaderboard 702 can serve as a filter for users in making internet video viewing decisions. Therefore, it can be appreciated that inclusion on the leaderboard 702 can affect the virality of an included video 714A-K, and, as a consequence, impact for example the content owner's revenue from advertisements based on a quantity of views, clicks, etc.

As discussed, indexing media content at an upload time can result in exclusion of the media content from leaderboards, such as example leaderboard 702. For example, media content uploaded at a first time, and designated as unpublished until a second time (e.g., after the first time) may be excluded from being listed in leaderboards. When leaderboards are calculated based on a number of views the media content has received since being indexed at the first time, the media content will likely have only a few, if any, views prior to the second time.

Figure 8:
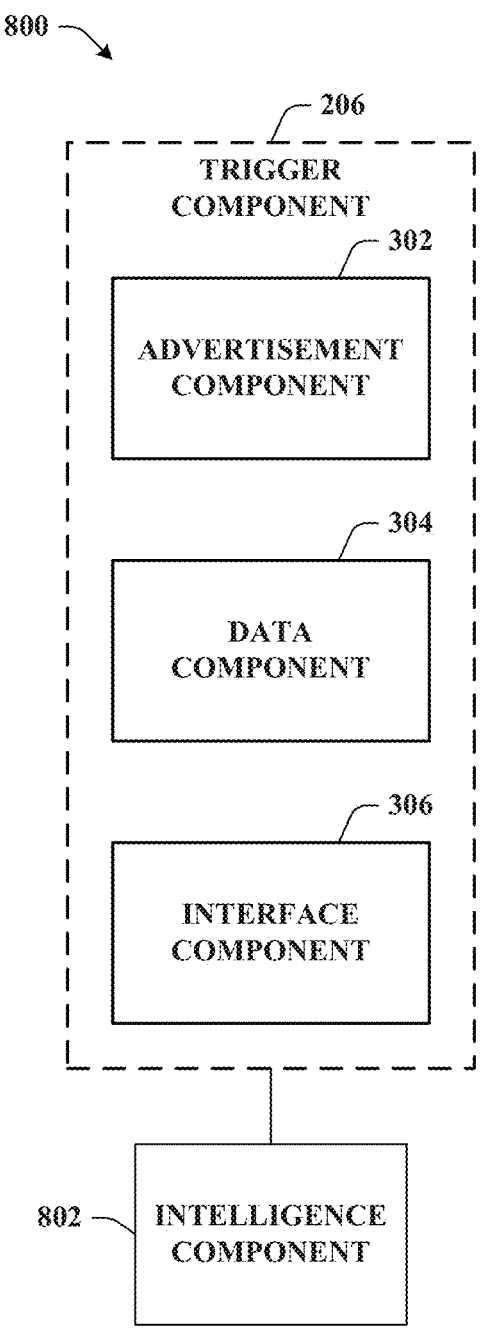
FIG. 8 illustrates an example scheduled publication system in accordance with various aspects described in this disclosure.

FIG. 8 illustrates an example system 800 that employs an intelligence component 802 that facilitates inferring and/or determining satisfaction of a set of predetermined conditions in accordance with various aspects described in this disclosure. For example, all or portions of trigger component 206, including advertisement component 302, data component 304, and interface component 306 are operatively coupled to intelligence component 802. Additionally or alternatively, all or portions of intelligence component 802 may be included in one or more components described in this disclosure. As discussed, the data component 304 obtains data relating to satisfaction of the set of predetermined conditions from a plurality of data sources (e.g., user input, associated databases, data feeds, the web, search engine results, data store 110, etc.). The intelligence component 802 facilitates inferring satisfaction of the set of predetermined conditions based at least in part on the data obtained by the data component 304. Additionally or alternatively, the intelligence component 802 infers that publishing should be delayed, or cancelled, based at least in part on the data obtained by the data component 304. For example, the intelligence component 802 can determine that additional conditions or triggers are required to ascertain satisfaction of the set of predetermined conditions, and that publishing should be delayed until the additional conditions or triggers are inferred or determined.

Accordingly, in order to provide for or aid in the numerous inferences described in this disclosure, intelligence component 802 examines the entirety or a subset of the data available and provides for reasoning about or infer states of the system, environment, client, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is used to develop models of priority.

Figure 9:
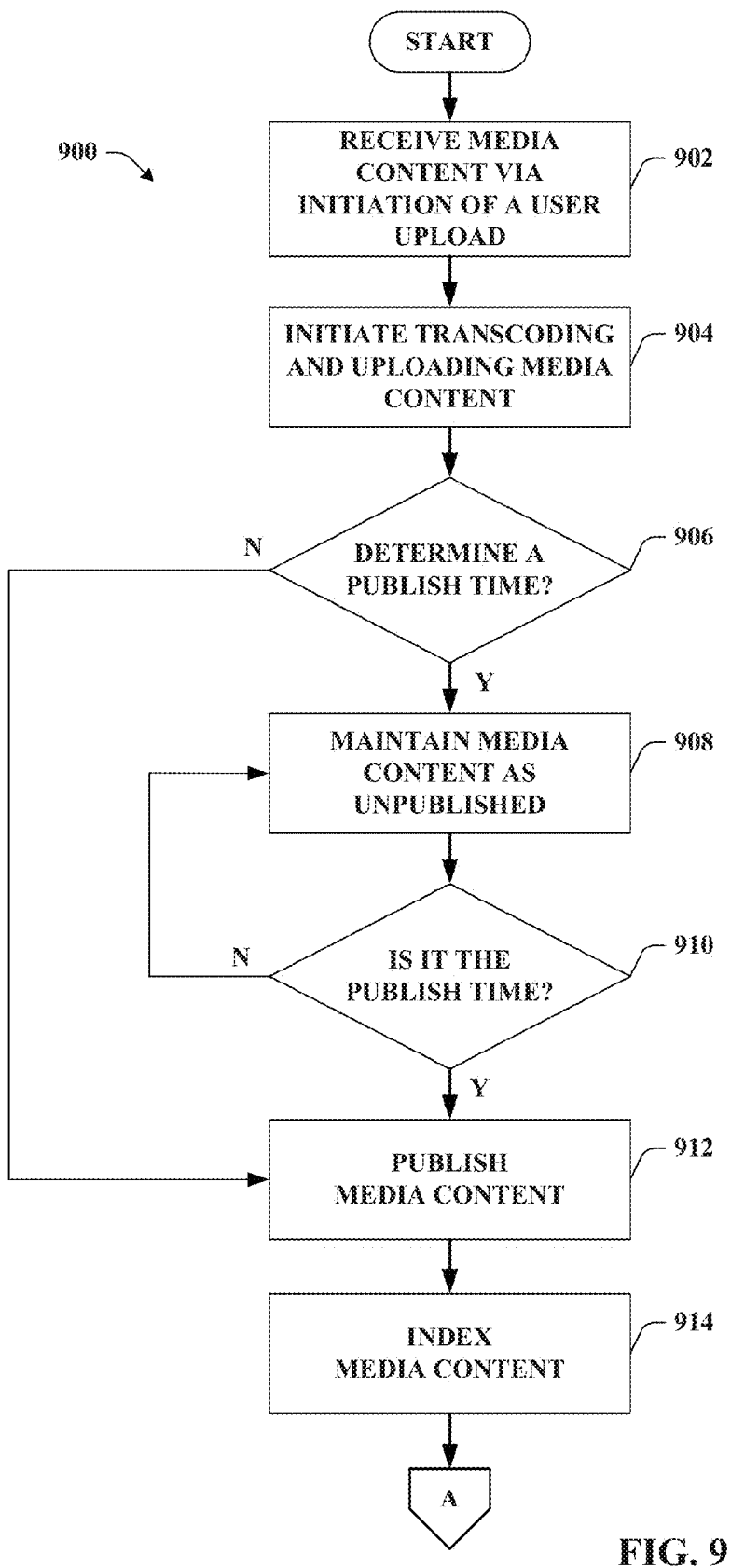
FIGS. 9-11 are example flow diagrams of respective methods for scheduled publication of online media in accordance with various aspects described in this disclosure.
Figure 10:
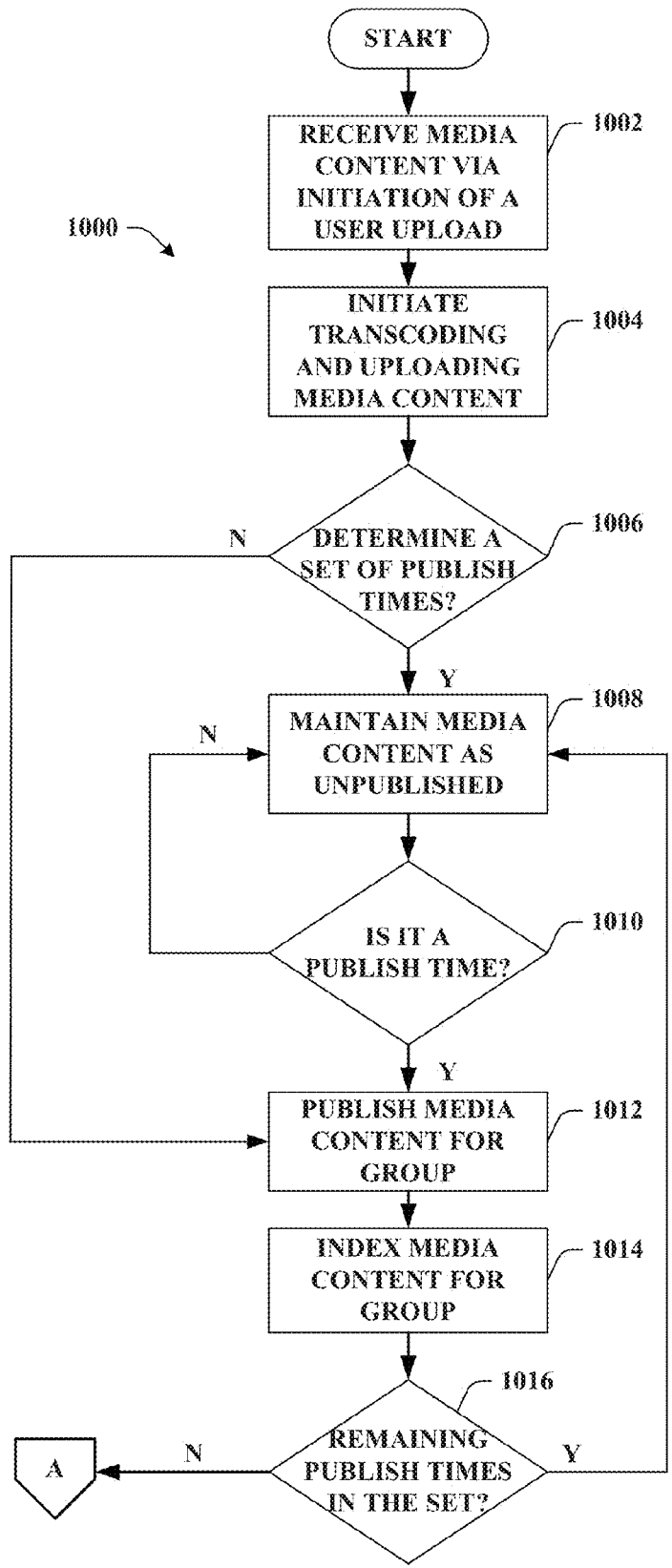
Figure 11:
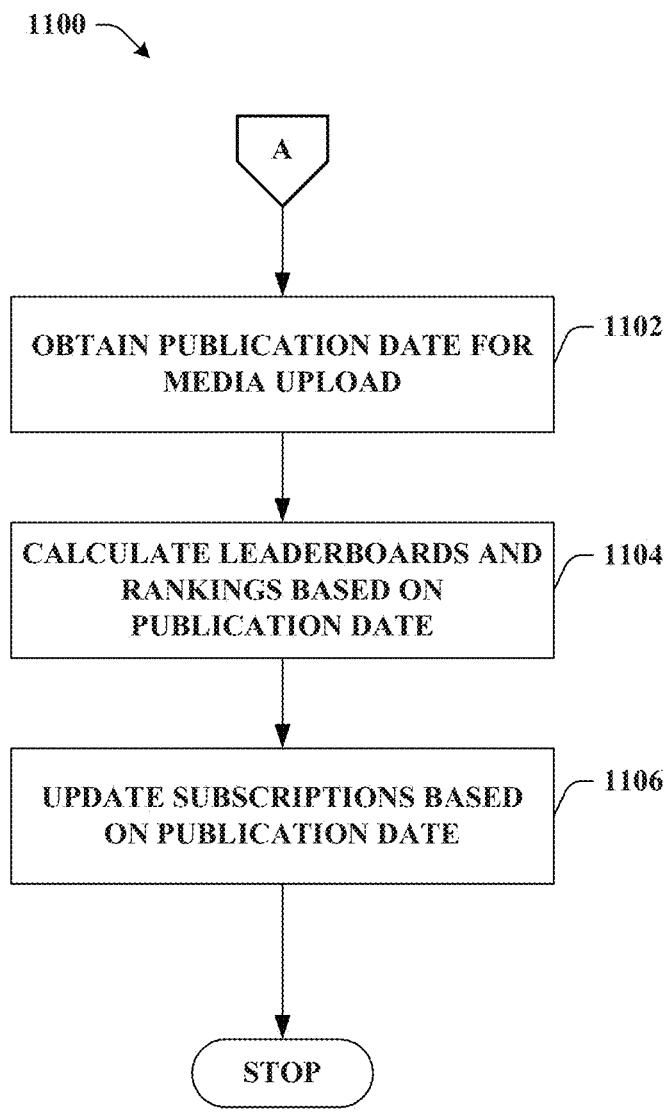

Non-Limiting Examples of Methods for Scheduled Online Publishing of Internet Media FIGS. 9-11 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described in this disclosure. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 9, illustrated is an example methodology 900 for scheduled online publication of internet media (e.g., video) in accordance with various aspects described in this disclosure. At reference numeral 902, media content is received, at a content server, via initiation of a user upload (e.g., using the upload component 102). For example, the media content can be received from a personal computer, laptop, net book, tablet, smart phone, mobile phone, camera, webcam, personal digital assistant, portable music player, portable video game system, video game system, web enabled television, or virtually any media capable device.

At reference numeral 904, transcoding and uploading of the media content is initiated (e.g., using the upload component 102). As used herein, transcoding (e.g., encoding, formatting or preparing for publication) can include, but is not limited to, converting the media from a first format to a second format, and/or compressing the media. At reference numeral 906, a determination is made whether a publish time has been determined for the media content (e.g., using the delayed-publishing component 105). The publish time can be based on express user input, a default setting, a set of predetermined user preferences, or satisfaction of a set of predetermined conditions. For example, the set of predetermined conditions can include, but is not limited to, advertisement approval, user approval, administrator approval, or occurrence of a predetermined event. If a publish time has not been determined for the media content (N at reference numeral 906), then the methodology advances to reference numeral 912.

Returning to reference numeral 906, if a publish time has been determined for the media content (Y at reference numeral 906), then at reference numeral 908, the media content is maintained as unpublished or with limited publication (e.g., using the publishing management component 107). For example, from the time of uploading the media content (at reference numeral 902) until the publish time, exposure of the media content can be limited to a set of authorized users, such as a content owner, administrators, advertisers, and/or authorized users designated by the content owner.

At reference numeral 910, a determination is made whether the current time satisfies a predetermined threshold of the publish time (e.g., using the publishing management component 107). If the current time does not satisfy the predetermined threshold of the publish time (N at reference numeral 910), then the methodology returns to reference numeral 908, and the media content is maintained as unpublished or with limited publication. Returning to reference numeral 910, if the current time satisfies the predetermined threshold of the publish time, then, at reference numeral 912, the content server publishes, or grants broader access, the media content (e.g., using the batch processing component 108). Additionally or alternatively, a flag (e.g., bit, value, variable, etc.) associated with the media content can be converted to allow for publication of the media content. At reference number 914, indexing of the media content is initiated (e.g., using the publishing management component 107). Indexing the media content includes, for example, collecting, parsing, and storing data (e.g., title, description, identifier, metadata, etc.) associated with the media content to assist in retrieval of the media content from the content server.

FIG. 10 illustrates an example methodology 1000 for a set of scheduled online publications of internet media in accordance with various aspects described in this disclosure. At reference numeral 1002, media content is received, at a content server, via initiation of a user upload (e.g. using the upload component 102). At reference numeral 1004, transcoding and uploading of the media content is initiated (e.g., using the upload component 102). As used herein, transcoding (e.g., encoding, formatting or preparing for publication) can include, but is not limited to, converting the media from a first format to a second format, and/or compressing the media.

At reference numeral 1006, a determination is made whether a set of publish times have been determined for the media content (e.g., using the groups component 204). Publish times included in the set of publish times are respectively associated with a set of groups. For example, the set of publish times can include a first publish time, a second publish time, and a third publish time, associated with a first group, a second group, and a third group, respectively. If the set of publish times has not been determined for the media content (N at reference numeral 1006), then the methodology advances to reference numeral 1012. Returning to reference numeral 1006, if the set of publish times has been determined for the media content (Y at reference numeral 1006), then at reference numeral 1008 the media content is maintained as unpublished for groups in the set of groups associated with publish times that have not occurred (e.g., using the publishing management component 107).

At reference numeral 1010, a determination is made whether the current time satisfies a predetermined threshold of at least one publish time in the set of publish times (e.g., using the publishing management component 107). If the current time does not satisfy the predetermined threshold of at least one publish time in the set of publish times (N at reference numeral 1010), then the methodology returns to reference numeral 1008, and the media content is maintained as unpublished for groups in the set of groups associated with publish times included that have not yet occurred (e.g., using the publishing management component 107).

Returning to reference numeral 1010, if the current time satisfies the predetermined threshold of at least one publish time in the set of publish times (Y at reference numeral 1010), then, at reference numeral 1012, the media content is published by the content server for the group associated with that publish time (e.g., using the batch processing component 108). Additionally or alternatively, a flag (e.g., bit, value, variable, etc.) associated with the media content can be converted to allow for publication of the media content for the group associated with the publish time. At reference numeral 1014, indexing of the media content is initiated for the corresponding group (e.g., using the batch processing component 108). Indexing the media content includes, for example, collecting, parsing, and storing data (e.g., title, description, identifier, metadata, etc.) associated with the media content to assist in retrieval of the media content from the content server.

At reference numeral 1016, a determination is made whether there are remaining publish times in the set of publish times that have not yet occurred. If there are remaining publish times (Y at 1016), then the methodology returns to reference numeral 1008, and the media content is maintained as unpublished for the groups associated with the remaining publish times (e.g., using the publishing management component 107).

Referring now to FIG. 11, illustrated is an example methodology 1100 for scheduled online publication of internet media in accordance with various aspects described in this disclosure. At reference numeral 1102, a publication date for a media upload is determined. If there are a set of publication dates, then one publication date included in the set of publication dates is determined to be the publication date, at reference numeral 1102. For example, a system administrator may set a first publication date in the set of publication dates as the publication date, or may set a publication date associated with a predetermined group of users (e.g., public) as the publication date.

At reference numeral 1104, leaderboards and rankings (e.g., most popular, etc.) are calculated based on the publication date of the media upload. For example, if media content is uploaded on August $1^{st}$, and published September $1^{st}$, then the September $1^{st}$ publication date is used for the leaderboard and rankings calculations.

At reference numeral 1106, user subscriptions are updated based on the publication date. For example, users can subscribe to media content associated with a another user, and the media upload (or an associated link) can be displayed on a subscriptions page. The subscriptions are updated based on publication dates, rather than upload dates. If subscriptions are updated based on upload dates, then the media content uploaded in the example above will be added to a user's subscription based on an August $1^{st}$ date, despite the media content not being published until September $1^{st}$. It can be appreciated that if users view their subscription page in a chronological order, then the media content can go unnoticed. In contrast, updating the subscriptions based on the publication date can facilitate more accurately adding the media content to the user's subscription page.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
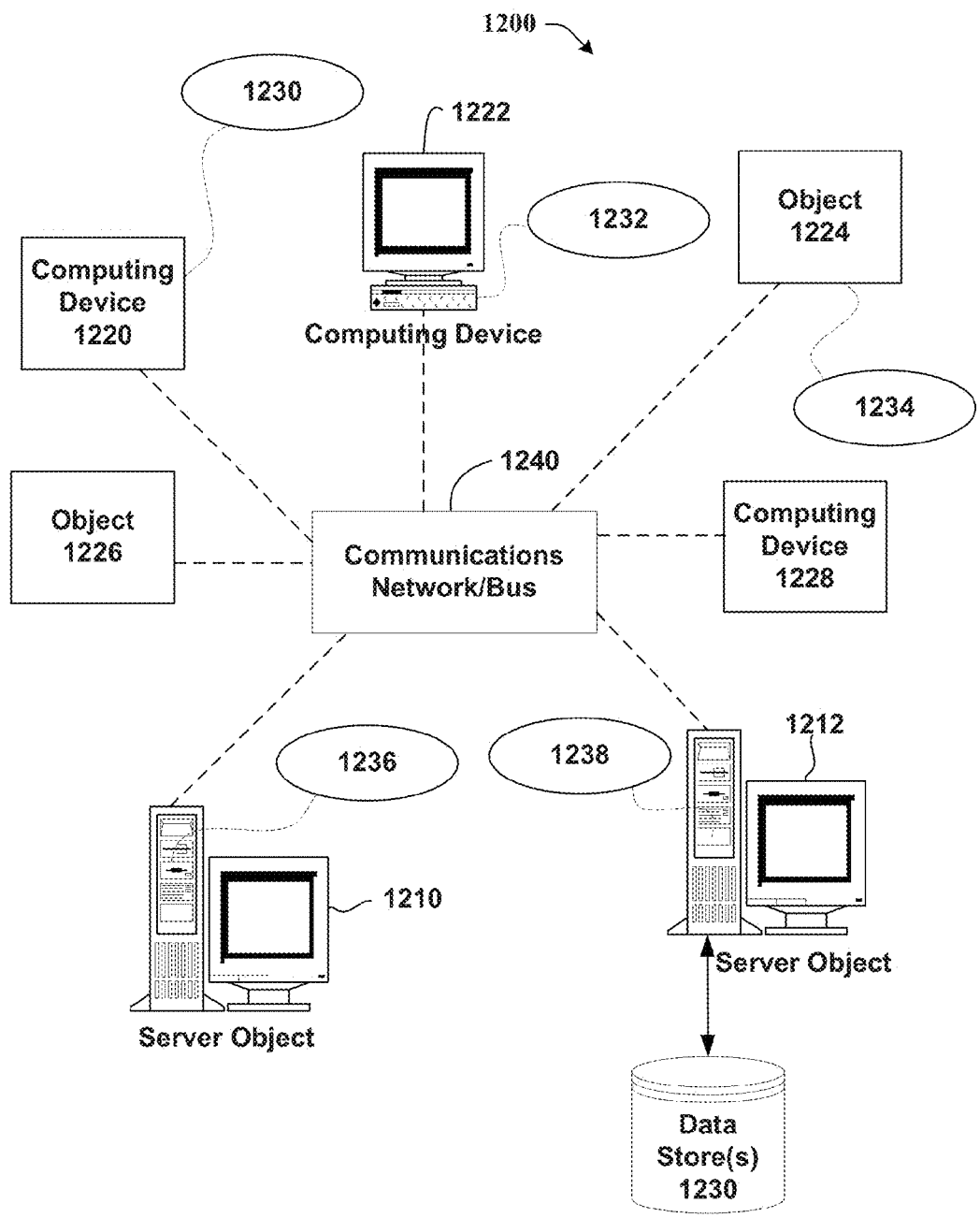
FIG. 12 is a block diagram representing an exemplary non-limiting networked environment in which the various embodiments can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal data assistants (PDAs), audio/video devices, mobile phones, MP3 players, personal computers, tablets, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1240 is the Internet, for example, the computing objects 1210, 1212, etc. can be Web servers with which the client computing objects or devices 1220, 1222, 1224, 1226, 1228, etc. communicate via any of a number of known protocols, such as the hypertext transfer protocol (HTTP). Objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described in this disclosure can be applied to any device suitable for implementing various embodiments described in this disclosure. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 13 is but one example of a computing device.

Although not required, embodiments can partly be implemented via an operating system, for use by a developer of services for a device or object, and/or included within application software that operates to perform one or more functional aspects of the various embodiments described in this disclosure. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
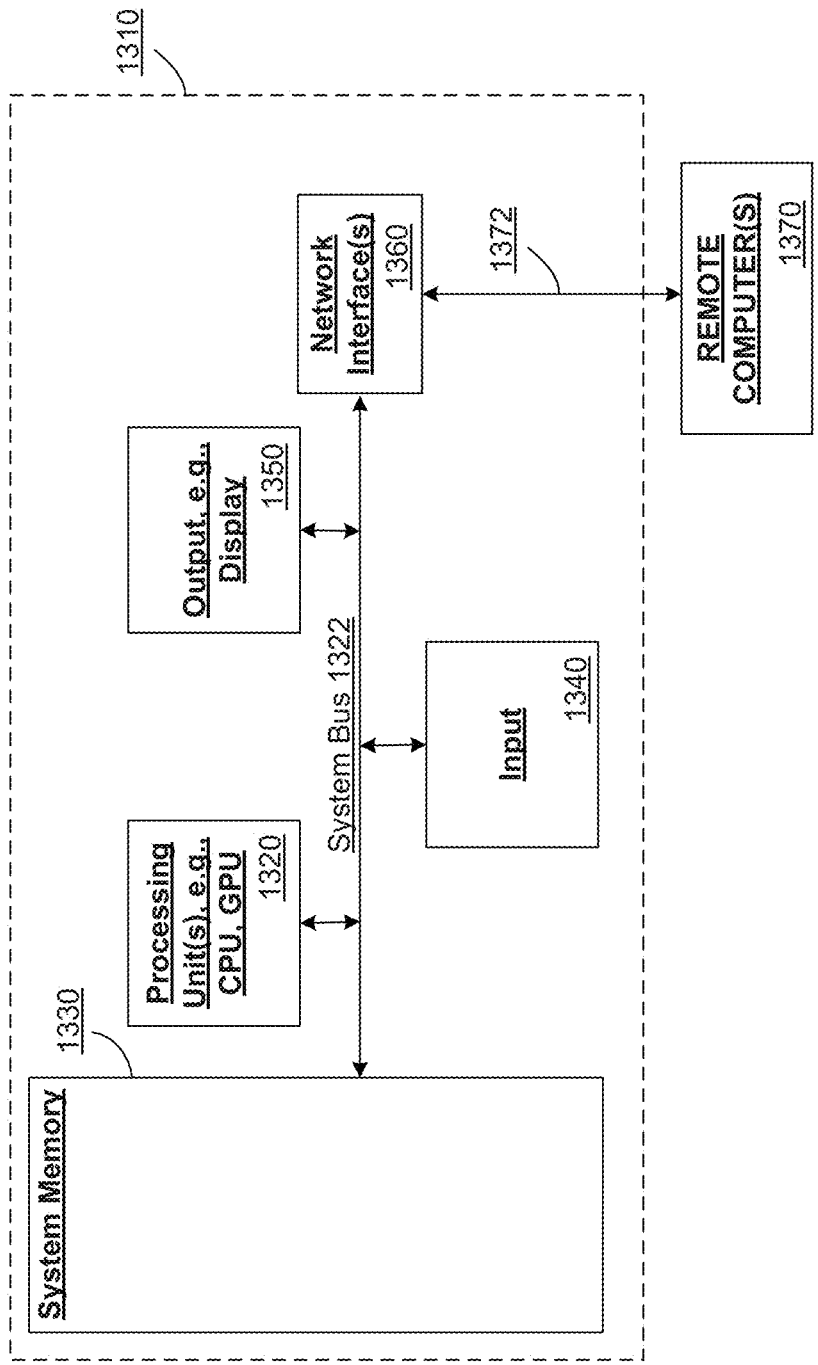
FIG. 13 is a block diagram representing an exemplary non-limiting computing system or operating environment in which the various embodiments may be implemented.

FIG. 13 thus illustrates an example of a suitable computing system environment 1300 in which one or aspects of the embodiments described in this disclosure can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used in this disclosure to mean serving as an example, instance, or illustration. For the avoidance of doubt, this matter disclosed in this disclosure is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described in this disclosure may be implemented in connection with hardware or software or, where appropriate, with a combination of both. As used in this disclosure, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described in this disclosure may also interact with one or more other components not specifically described in this disclosure but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

What is claimed is:

1. A device, comprising:
a memory that stores computer executable components; and
a processor that executes the following computer executable components stored within the memory:
an upload component that receives media content at an upload time and a publishing criterion representing a criterion for publishing the media content, wherein the publishing criterion comprises a result of a political election and a predetermined quantity of advertisements approved for association with the media content that meet a monetary threshold;
a delayed-publishing component that determines, based on the publishing criterion, a publish time that is delayed, with respect to the upload time, for the media content;
a publishing management component that maintains the media content as not accessible during a delayed publishing period defined as a period starting from the upload time and ending at the publish time; and
a batch processing component that:
grants, in response to occurrence of the publish time, access to the media content to at least one group of users; and
indexes the media content based in part on the publish time.

2. The device of claim 1, wherein the delayed-publishing component determines, based on the publishing criterion comprising data representing a determined period of time starting from the upload time, the publish time for the media content.

3. The device of claim 1, wherein in response to the upload component not receiving the publishing criterion, the delayed-publishing component determines the publish time based on a default publish time.

4. The device of claim 1, wherein the publishing criterion further comprises a user input.

5. The device of claim 1, wherein the delayed-publishing component determines, for the media content, respective publish times associated with groups of users.

6. The device of claim 5, wherein the publishing management component maintains the media content as not accessible for a group of users of the groups of users, until an associated publish time for the group of users.

7. The method of claim 5, wherein the batch processing component:
indexes the media content based in part on a first publish time of the set of publish times associated with a first group of the set of groups of users; and
indexes the media content based in part on a second publish time of the set of publish times associated with a second group of the set of groups of users.

8. The device of claim 1, wherein at least one of the upload component, the delayed-publishing component, the publishing management component, or the batch processing component is included in a content server that provides the media content to at least one device associated with a content consumer.

9. The method of claim 1, wherein the batch processing component indexes the media content by generating, based in part on the publish time, a time sensitive set of media content.

10. A method, comprising:
receiving, by a system including a processor, media content at a content server at an upload time;
receiving, by the system, a criterion for determining a future publish time, wherein the criterion comprises a result of a political election and a predetermined quantity of advertisements approved for association with the media content that meet a monetary threshold;
determining, by the system based on the criterion, the future publish time for the media content, wherein the future publish time occurs after the upload time;
maintaining, by the system, the media content as not accessible for view at the content server until occurrence of the future publish time; and
publishing, by the system, the media content at the future publish time, wherein publishing the media content comprises maintaining the media content as accessible for view.

11. The method of claim 10, wherein the determining the future publish time includes determining that the criterion has been satisfied.

12. The method of claim 10, wherein the criterion further comprises an approval of the media content from an advertiser owning an advertisement associated with the media content.

13. A device comprising:
means for determining, based on satisfaction of a predetermined criterion, a first publish time for a video file, that is delayed with respect to an upload time associated with the video file, wherein the predetermined criterion comprises a result of a political election and a predetermined quantity of advertisements approved for association with the media content that meet a monetary threshold;
means for maintaining the video file as unpublished until the first publish time, wherein maintaining the video file as unpublished comprises restricting access to the video file; and means for publishing the video file at the first publish time, wherein publishing the video file comprises allowing access to the video file.

14. The device of claim 13, further comprising:

means for determining a second publish time for the video file, wherein the first publish time is associated with a first group of users, and the second publish time is associated with a second group of users;

means for maintaining the video file as unpublished for the first group of users until the first publish time; and means for maintaining the video file as unpublished for the second group of users until the second publish time.

15. A non-transitory computer-readable medium having instructions stored thereon that, in response to execution, cause a system including a processor to perform operations comprising:

receiving a media upload;

receiving a publish condition for the media upload, wherein the publish condition comprises a result of a political election and a predetermined quantity of advertisements approved for association with the media content that meet a monetary threshold;

restricting displaying of the media upload based on the publish condition;

allow, based on occurrence of the publish condition, the displaying of the media upload at a publish time determined based on the publish condition.

16. The system of claim 15, wherein the publish condition further comprises an approval of the media upload from an advertiser owning an advertisement associated with the media upload.

* * * * *